United States Patent [19]
LaPlaca

[11] 4,167,270
[45] Sep. 11, 1979

[54] RECREATIONAL VEHICLE SKID SUPPORT

[76] Inventor: Paul LaPlaca, 11574 Porterville Rd., East Aurora, N.Y. 14052

[21] Appl. No.: 865,850

[22] Filed: Dec. 30, 1977

[51] Int. Cl.² .......................................... B62B 13/18
[52] U.S. Cl. ..................................................... 280/8
[58] Field of Search ................................ 280/8, 9, 767

[56] References Cited

U.S. PATENT DOCUMENTS

| | | | |
|---|---|---|---|
| 1,151,474 | 8/1915 | Kepler | 280/8 |
| 1,178,722 | 4/1916 | Hoover | 280/8 |
| 1,314,173 | 8/1919 | Waller | 280/8 |
| 1,907,321 | 5/1933 | Hilstrom | 280/9 |
| 2,075,934 | 4/1937 | Gold | 280/767 |
| 2,134,618 | 10/1938 | Long | 280/9 |
| 2,461,758 | 2/1949 | Moss | 280/767 |
| 3,190,674 | 6/1965 | Carter | 280/767 |
| 3,523,697 | 8/1970 | O'Sullivan | 280/767 |

Primary Examiner—Joseph F. Peters, Jr.
Assistant Examiner—Norman L. Stack, Jr.
Attorney, Agent, or Firm—Bean, Kauffman & Bean

[57] ABSTRACT

A recreational vehicle skid support includes a pair of skids suspended beneath a vehicle in an operative position in which they are disposed slightly above a road surface, when tires of the vehicle are properly inflated, and adapted for movement in fore and aft directions relative to the direction of vehicle travel. The skids are individually fixed against rearwardly directed movement by a link chain, and resiliently constrained against forwardly directed movements by a coil spring.

8 Claims, 4 Drawing Figures

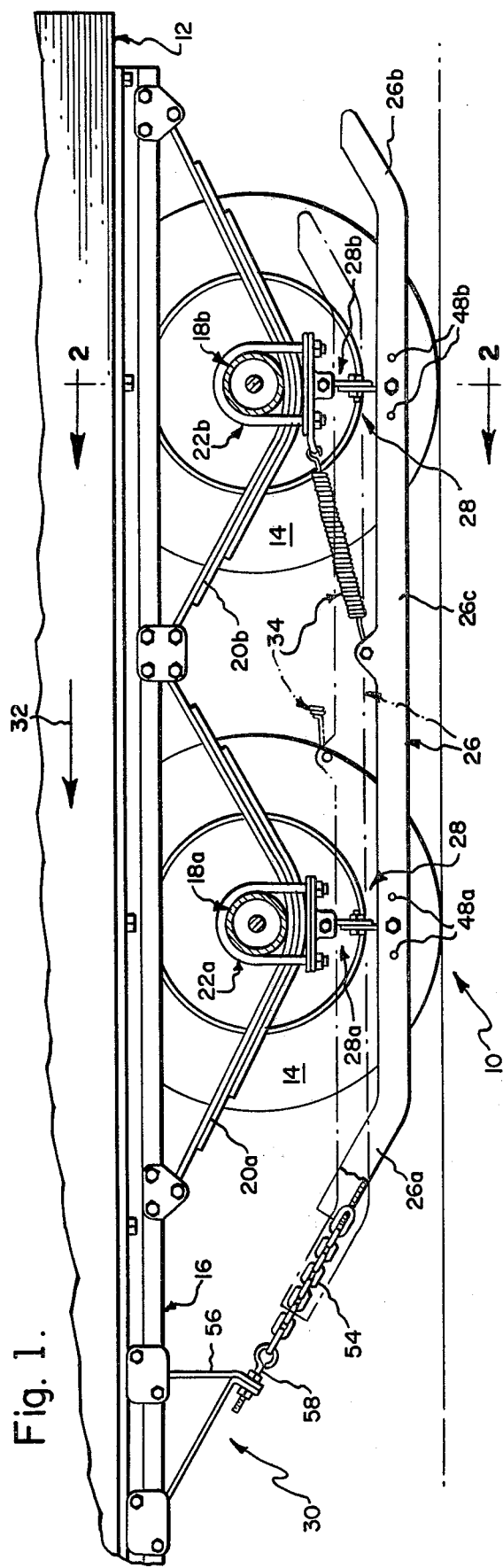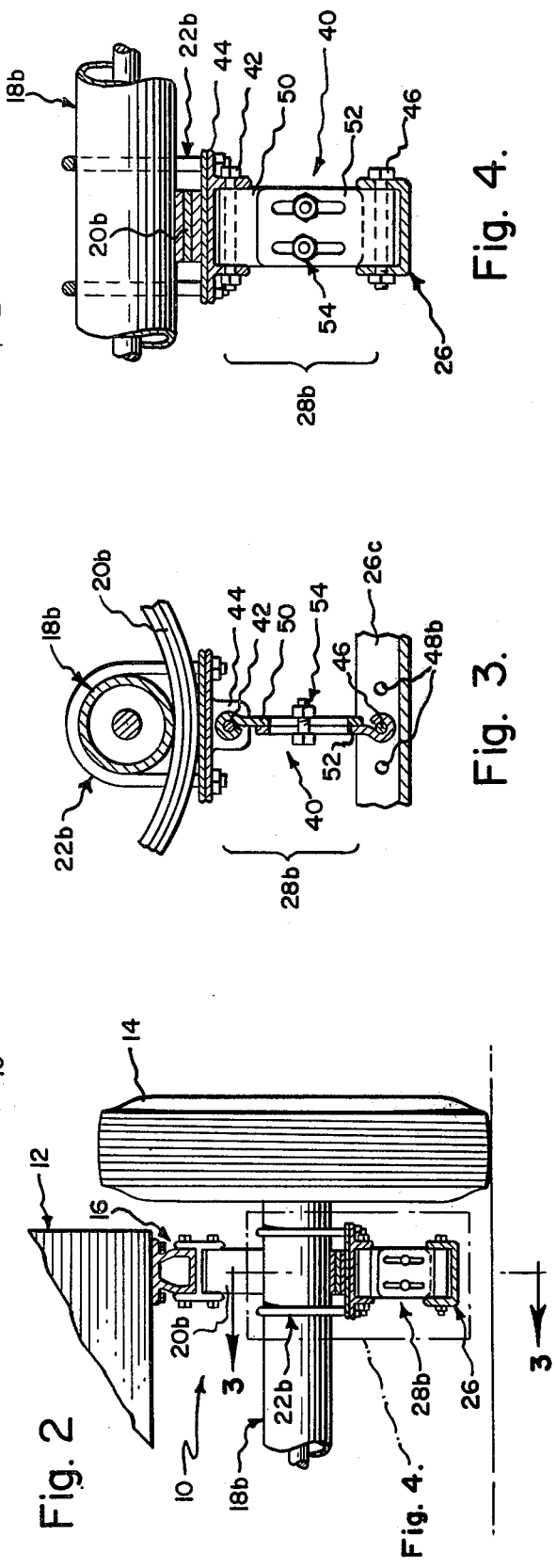

4,167,270

RECREATIONAL VEHICLE SKID SUPPORT

BACKGROUND OF THE INVENTION

Skid supports have been proposed for use in preventing overturning/swerving of a vehicle in the event of loss or blowout of a vehicle tire. As by way of example, U.S. Pats. Nos. 1,151,474; 1,178,722 and 2,461,758 disclose skid supports, which include a skid fixed to the axle of a vehicle to assume an operative position, wherein the skid is aligned with the direction of vehicle travel and disposed for sliding engagement with a road surface upon deflation of an adjacent vehicle tire. Somewhat similar structures are disclosed by U.S. Pat. No. 1,314,173, which is directed towards a skid for use in preventing the overturning of a railroad baggage truck in the event of a truck wheel running into a hole or depression, and U.S. Pat. No. 2,134,618, which is directed towards a truck operator controlled, retractable skid having use in both avoiding skidding of a vehicle and aiding return of such vehicle to a road surface in the event the vehicle wheels run off such surface.

SUMMARY OF THE INVENTION

The present invention is directed towards an improved skid support particularly adapted for use with recreational vehicles, such as drawn house trailers. More particularly, the present invention features an improved mounting arrangement adapted to selectively and adjustably mount a pair of skids to depend from the ends of a pair of vehicle axles to normally assume an operative position, wherein the skids are disposed one on each side of the vehicle in alignment with its direction of travel and spaced from engagement with a road surface when the tires of the vehicle are properly inflated. Chains connected to the front end of each skid are employed to prevent rearwardly directed movements thereof away from their operative positions, when the skids engage with a road surface, whereas tension springs act in opposition to the chains for normally retaining the skids in their operative positions, while being deformable to permit forwardly directed pivotal/vertically directed retracting movements of the skids upon engagement thereof with ground obstacles, when the vehicle is "backed up".

DRAWINGS

FIG. 1 is an elevational view of a skid support for a recreational vehicle embodying the present invention;

FIG. 2 is a sectional view taken generally along the line 2—2 in FIG. 1;

FIG. 3 is a sectional view taken generally along the line 3—3 in FIG. 2; and

FIG. 4 is an enlarged view of the area generally designated as FIG. 4 in FIG. 2.

DETAILED DESCRIPTION

A recreational vehicle skid support of the present invention includes a pair of skid assemblies 10, which are suspended one below each side of vehicle 12, such as a drawn house trailer, in order to prevent overturning or swerving of the vehicle in the event of a blowout of any of vehicle tires 14 with which the respective skid assemblies are associated. In the drawing, only one of assemblies 10 is shown, but it will be understood that the non-illustrated assembly is identical in structure and the mode of mounting to that to be described in detail.

Vehicle 12 is shown for purposes of reference as including a suitable framework 16 and a pair of axles 18a and 18b, which serve to mount tires 14 adjacent their opposite ends and are in turn fixed to framework 16 by leaf springs 20a and 20b and axle-spring clamping collars 22a and 22b. The illustrated construction of vehicle 12 is conventional.

Now referring specifically to FIGS. 1 and 2, it will be understood that each of skid assemblies 10 includes an elongated skid 26; support means 28 for suspending skid 26 beneath vehicle 12 in its operative position shown in full line in FIG. 1; restraining means 30 for restraining movement of skid 26 from its operative position in a direction opposite to the normal or forward direction of vehicle travel designated by arrow 32; and resilient means 34 for providing a bias opposing movement of skid 26 from its operative position in the direction of arrow 32. When in operative position, skid 26 is disposed essentially parallel to a road surface designated as R.S., and spaced therefrom through a distance sufficient to prevent engagement with the road surface during normal vehicle operation with its associated tires in properly inflated condition. However, the spacing is such as to bring skid 26 into sliding engagement with the road surface, whenever a tire or tires with which such skid is associated suffers a blowout.

Skid 26 is preferably of U-shaped cross-sectional or channel construction and is characterized as having upwardly turned front and rear end portions 26a and 26b, respectively, which are formed integrally with a straight and relatively expansive central portion 26c.

Support means 28 preferably includes a pair of identical support assemblies 28a and 28b, which are best shown in FIGS. 3 and 4 are comprising a bracket means 40; an upper hinge means, such as may be defined by an upper hinge pin 42 and a hinge plate 44, for connecting bracket means 40 to its associated one of clamping collars 22a or 22b and thus axles 18a and 18b of vehicle 12; and a lower hinge means, such as may be defined by a lower hinge pin 46, for connecting braket means 40 to skid 16. Preferably, hinge plates 4 are removably bolt connected to their associated clamping collars in the manner illustrated in the drawings. It will be undersood that the axes of the hinge pins 42 and 46 are parallel and extend horizontally of the vehicle in a direction transversely of the direction of vehicle travel; and that skid central portion 26c is formed with two series of apertures 48a and 48b for selectively and removably receiving the lower hinge pins of assemblies 28a and 28b in order to adjustably accommodate for variations in spacing between axles of different vehicles and permit bracket means 40 to be maintained in an essentially parallel relationship. Further, it will be understood that each of bracket means 40 is defined by upper and lower parts or plates 50 and 52, which are adjustably fixed one to another by bolt-slot devices 54, whereby permitting independent vertical adjustment of the operative position of each skid to accommodate for variations in axle clearances and tire sizes between different vehicles.

By again viewing FIG. 1, it will be understood that support means 28 provides a parallelogram type hinge support for skid 26 permitting same to pivot or swing forwardly and upwardly into a retracted position shown in broken line in FIG. 1 or rearwardly and upwardly into an alternative retracted position, not shown. In accordance with the present invention, movement of skid 26 towards its alternative retracted position is intentionally prevented by restraining means 30, which is preferably in the form of a metal link chain 54 having its opposite ends fastened to skid front portion 26a and vehicle framework mounted bracket 56. Preferably, an adjustment screw or similar device 58 is employed to adjustably connect chain 54 to bracket 56 in order to accommodate for variations in the operative position of skid 26 occasioned by vertical and/or horizontal adjustments of the skid relative to axles 18a and 18b. Preferably, chain 54 is adjusted to permit bracket means 40 to assume their vertically upstanding positions shown in the drawings, when skid 26 is in its operative position.

Resilient means 34 is preferably in the form of a coil type tension spring whose opposite ends are connected to the hinge plate 44 of support assembly 28b and skid 26 at a point intermediate the support assemblies. As will be apparent from viewing FIG. 1, the spring acts in opposition to chain 54 for normally retaining skid 26 in its operative position, while being resiliently deformable to permit temporary movements of the skid towards its retracted position shown in FIG. 1, upon engagement of skid rear end portion 26b with an unseen ground obstacle, such as oftimes may be encountered when a recreational vehicle is "backed up" into an uneven, "off the road" camping space. This cooperative arrangement of a flexible chain and a spring also serves to retard or dampen noise/wear producing vibrations of the skid assemblies during normal vehicle travel.

The skid support of the present invention has been disclosed with specific reference to its use with recreational vehicles having a pair of axles to which the skid support is directly affixed. However, as will be apparent, the skid support may be modified, if desired, to mounting on vehicles having a single axle.

I claim:

1. In a skid support for a recreational vehicle of the type having a pair of skid assemblies suspended one below each side of said vehicle in order to prevent overturning or excessive swerving of said vehicle in the event of blowout of a vehicle tire, the improvement wherein each of said skid assemblies comprises in combination:

an elongated skid;
support means for suspending said skid beneath said vehicle in an operative position while permitting retracting movements of said skid from said operative position alternatively in directions extending forwardly/upwardly and rearwardly/upwardly relative thereto, said skid when said operative position being aligned with the direction of travel of said vehicle and spaced from engagement with said road surface when the tires of said vehicle adjacent to which said skid is disposed are properly inflated and for engagement with said road surface when said tires are deflated, said support means including at least one support assembly having bracket means, upper hinge means for connecting said bracket means for movement relative to said vehicle about a first axis and lower hinge means for connecting said skid for movement relative to said bracket means about a second axis, said first and second axes being parallel and extending horizontally in a direction transversely of said direction of travel;
restraining means for preventing said retracting movements of said skid from said operative position in a direction rearwardly/upwardly relative thereto; and
resilient means cooperating with said restraining means for normally maintaining said skid in said operable position while permitting said retracting movements of said skid from said operative position in a direction forwardly/upwardly relative thereto against the bias of said resilient means incident to engagement of said skid by a ground obstacle during rearwardly directed movement of said vehicle.

2. The improvement according to claim 1, wherein said restraining means is a link chain, and said chain and said resilient means have first ends thereof fixed to said vehicle and second ends theeof fixed to said skid.

3. The improvement according to claim 1, wherein said bracket means includes upper and lower bracket parts fixed to said upper and lower hinge means, respectively, and means to adjustably fix said bracket parts one to another for adjustably varying the distance said skid when in said operative position and said road surface.

4. The improvement according to claim 3, wherein said restraining means is a link chain, and said chain and said resilient means have first ends thereof fixed to said vehicle and second ends thereof fixed to said skid.

5. The improvement according to claim 3, wherein said support means includes a pair of support assemblies, including front and rear assemblies coupled with front and rear ends of said skid, respectively, the axes of said assemblies being parallel, and at least one of said lower hinge means of said assemblies being adjustably fixed to said skid to selectively vary the distance between said lower hinge means of said assemblies lengthwise of said skid.

6. The improvement according to claim 5, wherein said restraining means is a link chain, and said chain and said resilient means have first ends thereof fixed to said vehicle and second ends thereof fixed to said skid.

7. In a skid support for a recreational vehicle of the type having a pair of skid assemblies suspended one below each side of said vehicle in order to prevent overturning or excessive swerving of said vehicle in the event of blowout of a vehicle tire, the improvement wherein each of said skid assemblies comprises in combination:

an elongated skid;
support means for suspending said skid beneath said vehicle in an operative position, wherein said skid is aligned with the direction of travel of said vehicle and spaced from engagement with said road surface when the tires of said vehicle adjacent to which said skid is disposed are properly inflated and for enagement with said road surface when said tires are deflated, said support means including at least one support assembly having bracket means, upper hinge means for connecting said bracket means for movement relative to said vehicle about a first axis and lower hinge means for connecting said skid for movement relative to said bracket means about a second axis, said first and second axes being parallel and extending horizontally in a direction transversely of said direction of travel;
a link chain for preventing movement of said skid from said operative position in a direction rearwardly of said vehicle, said chain having opposite ends thereof fixed to said vehicle and said skid; and
resilient means for providing a bias opposing movement of said skid from said operative position in a direction forwardly of said vehicle.

8. In a skid support for a recreational vehicle of the type having a pair of skid assemblies suspended one below each side of said vehicle in order to prevent overturning or excessive swerving of said vehicle in the event of blowout of a vehicle tire, said vehicle being characterized as including a pair of adjacently disposed axles, the improvement wherein each of said skid assemblies comprises in combination:

an elongated skid;

support means for suspending said skid beneath said vehicle in an operative position, wherein said skid is aligned with the direction of travel of said vehicle and spaced from engagement with said road surface when the tires of said vehicle adjacent to which said skid is disposed are properly inflated and for engagement with said road surface when said tires are deflated, said support means including front and rear support assemblies bolt affixed to depend from front and rear ones of said axles and coupled with front and rear ends of said skid, respectively, each of said assemblies having upper and lower bracket parts, upper hinge means for connecting said upper bracket part to its associated one of said pair of axles for movement relative to said vehicle about a first axis, lower hinge means for connecting said skid for movement relative to said lower bracket part about a second axis, said first and second axes of said assemblies being parallel and extending horizontally in a direction transversely of said direction of travel and means to adjustably fix said bracket parts one to another for adjustably varying the distance between said skid when in said operative position and said road surface, said lower hinge means of said assemblies being adjustably fixed lengthwise of said skid;

a link chain for preventing movement of said skid from said operative position in a direction rearwardly of said vehicle, said chain having opposite ends thereof fixed to said vehicle and said front end of said skid; and a coil spring for providing a bias opposing movement of said skid from said operative position in a direction forwardly of said vehicle, said spring having opposite ends thereof fixed to said vehicle and said skid at a point intermediate said support assemblies.

* * * * *

UNITED STATES PATENT AND TRADEMARK OFFICE
CERTIFICATE OF CORRECTION

PATENT NO. : 4,167,270
DATED : September 11, 1979
INVENTOR(S) : Paul LaPlaca

It is certified that error appears in the above-identified patent and that said Letters Patent are hereby corrected as shown below:

Col. 2, Line 34 - "are" should be --- as ---.

Col. 2, Line 40 - "braket" should be --- bracket ---.

Col. 2, Line 41 - "plates 4" should be --- plates 44 ---.

Col. 3, Line 48 - "forwardlyupwardly" should be --- forwardly/upwardly ---.

Col. 4, Line 13 - "theeof" should be --- thereof ---.

Signed and Sealed this

Twenty-fifth Day of December 1979

[SEAL]

Attest:

SIDNEY A. DIAMOND

Attesting Officer

Commissioner of Patents and Trademarks